United States Patent [19]
Banker et al.

[11] Patent Number: 5,058,160
[45] Date of Patent: Oct. 15, 1991

[54] IN-BAND CONTROLLER

[75] Inventors: Robert O. Banker, Cumming; Randolph Schaubs, Stone Mountain; Michael Harney, Atlanta; Jay C. McMullan, Jr., Doraville; anthony J. Wasilewski, Lawrenceville; Gregory S. Durden, Jonesboro; Rdy T. haman, Jr., Duluth; David Naddor, Doraville; William B. Thatcher, Jr., Alpharetta, all of Ga.

[73] Assignee: Scientific-Atlanta, Inc., Atlanta, Ga.

[21] Appl. No.: 593,329

[22] Filed: Oct. 1, 1990

Related U.S. Application Data

[63] Continuation of Ser. No. 188,481, Apr. 29, 1988, abandoned.

[51] Int. Cl.$^5$ .......................................... H04N 7/167
[52] U.S. Cl. ..................................................... 380/20
[58] Field of Search .......................................... 380/20

[56] References Cited

U.S. PATENT DOCUMENTS

| | | | |
|---|---|---|---|
| 4,092,596 | 5/1978 | Dickinson et al. | 375/17 |
| 4,109,281 | 8/1978 | Karzashi et al. | 380/7 |
| 4,322,745 | 3/1982 | Saeki et al. | 358/123 |
| 4,450,477 | 5/1984 | Lovett | 358/86 |
| 4,475,123 | 10/1984 | Dumbauld et al. | 380/20 |
| 4,494,138 | 1/1985 | Shimp | 358/86 |
| 4,536,791 | 8/1985 | Campbell et al. | 380/20 |
| 4,587,651 | 5/1986 | Nelson et al. | 370/88 |
| 4,597,077 | 6/1986 | Nelson et al. | 370/88 |
| 4,611,242 | 9/1985 | Williams | 380/20 |
| 4,623,920 | 11/1986 | Dufresne et al. | 380/20 |
| 4,633,309 | 12/1986 | Li et al. | 380/20 |
| 4,679,191 | 7/1987 | Nelson et al. | 370/88 |
| 4,682,360 | 7/1987 | Frederickson | 380/20 |
| 4,694,490 | 9/1987 | Harvey et al. | 380/20 |
| 4,712,239 | 12/1987 | Frezza et al. | 380/20 |
| 4,716,588 | 12/1987 | Thompson et al. | 380/20 |
| 4,736,421 | 4/1988 | Morita et al. | 380/20 |
| 4,739,510 | 4/1988 | Jeffers et al. | 380/20 |
| 4,760,597 | 7/1988 | Hayes et al. | 380/20 |
| 4,763,317 | 8/1988 | Lehman et al. | 370/58 |
| 4,802,214 | 1/1989 | Barany et al. | 380/20 |
| 4,817,144 | 3/1989 | Cirra et al. | 380/20 |
| 4,823,386 | 4/1989 | Dumbauld et al. | 380/13 |

OTHER PUBLICATIONS

"Satellite & Cable TV Scrambling and Descrambling", B. Gale et al., pp. 75–78; Baylin/Gale Production Publisher; Jun. 1986.

"Video Scrambling & Descrambling for Satellite & Cable TV"; R. Graf et al.; Howard Sams & Co. Publisher; Indianapolis, Ind.; p. 7; date unknown.

*Primary Examiner*—Thomas H. Tarcza
*Assistant Examiner*—Tod Swann
*Attorney, Agent, or Firm*—Banner, Birch, McKie & Beckett

[57] ABSTRACT

The present invention discloses a method and apparatus for providing a cable TV system with the ability to issue information from a system manager, determine whether the information is intended for a set top designed to receive out-of-band information or in-band information, send the information to the appropriate circuitry. Reformatting of some information is necessary and is performed by a format translator. For in-band information, information may be sent over one or more of a plurality of data streams. Certain types of information are sent over one or more data streams based on the type of information and characteristics of the data streams. It is further disclosed that for efficiency, similar information intended for several addresses is grouped together in a database manager so that the information may be sent to plural addresses at one time. Scramblers are employed with the capability of inserting data onto nonscrambled channels.

12 Claims, 13 Drawing Sheets

FIG. 11

| BEGINNING FLAG 01111110 | ADDRESS 8 BITS | CONTROL 8 BITS | INFORMATION FIELD N X 8 BITS | FRAME CHECK 16 BITS | ENDING FLAG 01111110 |

FIG. 12

SDLC FRAME

| BEGINNING FLAG | ADDRESS | CONTROL | INFORMATION FIELD | FRAME CHECK | ENDING FLAG |

TRANSPORT LAYER TRANSACTION

FIG. 13

| TRANS- ACTION CODE 1 BYTE | BLOCK 1 4 BYTES | BLOCK 2 4 BYTES | - - - | BLOCK 7 4 BYTES | BLOCK 8 4 BYTES |

FIG. 14

| GLOBAL 00h 1 BYTE | COMMAND CODE 1 BYTE | DATA LENGTH 1 BYTE | DATA 0 - 255 BYTES |

FIG. 15

| SCRAMBLER ADDRESS 1 BYTE | COMMAND CODE 1 BYTE | DATA LENGTH 1 BYTE | DATA 0 - 255 BYTES |

FIG. 16

| SCRAMBLER ADDRESS 1 BYTE | COMMAND CODE 1 BYTE | DATA LENGTH 1 BYTE | DATA 0 - 255 BYTES |

IN-BAND CONTROLLER

This application is a continuation of application Ser. No. 07/188,481, filed Apr. 29, 1988 now abandoned.

BACKGROUND OF THE INVENTION

The present invention is directed to cable TV systems wherein video signals are sent from a headend to individual settop terminals (STT) which are typically located in any convenient television viewing area. As is well known in the art, various levels of service are available to the set top terminals. Subscribers may choose from a wide variety of programs offered by a cable TV service. Since a cable TV service may provide many different programs, it is important to know which programs each individual set top is authorized to receive. Additionally, it is necessary to send other information from the headend to a set top for various other purposes as is well known in the art.

Prior systems used a separate data channel centered about 108.2 MHz to convey this information to the settop converters. The individual settop terminals each had a separate tuner which was always tuned to this frequency to receive any data that may have been sent down from the headend. Since this channel is outside the band of channels that are used for sending video signals, this type of system has commonly been referred to in the art as an "out-of-band" system.

One drawback to such a system is that each settop terminal needs a tuner to tune to the 108.2 MHz frequency as well as a variable tuner to tune to the selected channel. The requirement of two tuners in the settop significantly increases the cost of building these settops. There are other drawbacks to this system as is well known in the art.

For these and other reasons, it has become desirable to provide what is referred to as an "in-band" type system. Known in-band systems send authorization information and other information to the STT's over a channel that is used to transmit video information. One problem encountered with in-band type systems is that in order for a settop terminal to receive information from a headend or other source, it must be tuned to the frequency over which the in-band information is being transmitted. Therefore, if information is sent out from a headend to all the settop terminals, only those terminals that are tuned to that frequency will receive that information at that time. This gives rise to the need for providing refresh data, or put another way, it is necessary to repetitively send out these data messages to ensure that all settop terminals will receive them.

A problem further arises for cable system operators in that switching from an in-band system to an out-of-band system is costly and causes significant down time while converters are being switched. Moreover, prior systems required that each STT be replaced with an in-band set top terminal (ISTT) capable of receiving in-band formatted data from the headend.

OBJECTS OF THE INVENTION

It is therefore an object of the present invention to overcome the drawbacks of the prior art. Specifically, it is one object of the present invention to provide a cable TV system that is capable of transmitting both in-band and out of band data transmissions to settop terminals. This system may be referred to as an "in-band/out of band compatible system."

It is another object of the invention to provide an in-band controller to determine whether a message sent from a headend is intended to be received by an out-of-band set top terminal or an in-band settop terminal.

It is a further object of this invention to provide a format translator for reformatting data received by the in-band controller that is intended to be received by an ISTT.

It is a further object of this invention to provide a database manager including a database file for grouping together similar data transactions intended for different settop terminals.

It is a further object of this invention to provide a refresh controller which efficiently allows an ISTT to receive refresh information.

It is a further object of this invention to provide an in-band scrambler interface to provide the capability of sending data to the scramblers over selected data streams.

It is a further object of this invention to provide in-band data over plural data streams.

SUMMARY OF THE INVENTION

In order to achieve these and other objects of the present invention, there is provided an in-band controller (IBC) which receives data from a system manager via a system manager interface.

SYSTEM MANAGER INTERFACE

The System Manager interface is one of the outside connections of the In-Band System. This process is responsible for gathering the data leaving the System Manager and routing this data to the appropriate modules. Data which is destined to Out-Of-Band Set Tops will be sent to the ATX Interface (another one of the outside interfaces) and the data destined to the In-Band Set Tops will be sent to the Format Translator module. The System Manager Interface is also capable of relating information back to the System Manager if an inquiry of data has been requested by the System Manager.

ATX INTERFACE

The ATX Interface is an optional feature of the In-Band System. The IBC can be configured to enable this interface. Transactions which are destined to Out-Of-Band STT(s) are sent to this interface by the System Manager Interface. The ATX Interface, in turn, will transmit these transactions to the ATX to be sent to the appropriate settop(s). In addition to the above, the ATX Interface also functions as a non-selective pass-through process sending ATX responses back to the System Manager Interface to be delivered to the System Manager.

FORMAT TRANSLATOR

This module is given system manager transactions and transforms them into In-Band transactions. The Format Translator receives current system manager type transactions from the System Manager Interface Module. All generated In-Band transactions are then given to the Data Base Manager for storage in the data base.

This task is complicated by the fact that there is not an all-encompassing one-to-one relationship between each system manager transaction and each In-Band transaction. The following are some types of situations the Format Translator will need to handle:

Translation of a system manager transaction into a complete In-Band transaction

Translation of a system manager transaction that causes a partial refinement of an existing In-Band transaction Handling system manager transactions that cause the addition or deletion of an In-Band transaction.

DATABASE MANAGER

The Database Manager is the process responsible for maintaining the Database. In order to control the flow of information into and out of the system, the Database manager has the capability of performing Add, Change, Delete, and Move (Copy) operations on any desired piece of information in its data files. The term 'Database' is used to refer to a collection of data files holding data necessary for the operation of the In-Band system.

There are preferably seven distinct data files, four of which have what will be denoted as "New List" files associated with them. Each data file isdesigned to serve a specific purpose. Each New List file keeps track of the most recent changes in data corresponding to its regular data file.

The Database manager is capable of searching for, locating, and retrieving a desired piece of information associated with a given key field (In-Band Set Top Digital Address or Channel Map Bit pattern).

CONTROL/STATUS MANAGER

All new system manager control transactions are taken by this module and dispatched to the appropriate In-Band modules. The Control/Status Manager also receives and passes back the responses that are generated by the completion of the control action requested. Control transactions can also be initiated from the Expert Operator Interface. Status inquiry transactions are also handled by this module.

Anytime an error occurs within the system that cannot be easily handled, this module is notified and takes an appropriate action.

Startup and shutdown of all processes in the In-Band Controller are handled by this module.

REFRESH CONTROLLER

This module constantly retrieves In-Band transactions from the data base and passes them on the In-Band Scrambler Interface. The refresh controller will ensure that In-Band transactions are sent out in a manner that is consistent with the refresh configuration list. This module preferably arranges the transactions so that none of the data streams are idle longer than the time it takes to sent out 3 transactions.

The Refresh Controller will preferably send out 120 transactions per second to the In-Band Scrambler Interface. Each of the 4 data streams will receive a unique set of 30 transactions from the base of 120 sent to the interface. Every 5 seconds this module will send out 116 transactions so that each data stream only receives 29 transactions. This ensures that the scramblers send out default transactions.

REFRESH CONFIGURATION MANAGER

This module is responsible for maintaining the refresh configuration list. This list is an ASCII disk file which describes the relative frequency and order that In-Band transactions are sent out to the scramblers. The system manager and expert operator interface can send information through the Control/Status Manager that will modify the list.

The major task of this module is to use this list to create data base retrieval requests to be used by the refresh controller. The refresh controller will send these requests to the data base at set intervals. This is done so that transactions will always be available to be sent out to the Scrambler interface.

IN-BAND SCRAMBLER INTERFACE

This module receives a list of pointers to In-Band transactions from the Refresh Controller. It takes each transaction and does a DMA transfer of the data into the custom hardware. SDLC protocol information is wrapped around the data and it is sent to scramblers over the indicated data stream. This module will block the refresh controller if it is offered a new set of pointers before the sending of the current set is done.

This module also sends control transactions to the scramblers and passes the appropriate responses to the Control/Status Manager. When status information is requested, it will send back the state of the data link.

BRIEF DESCRIPTION OF THE DRAWINGS

FIGS. 11, 12, 13, 14, 15, and 16 are block diagrams illustrating various signal formats.

DETAILED DESCRIPTION

There are at least two system configurations possible for the in-band addressable system. To understand these configurations, it is helpful to first understand the system components.

Figure 1:
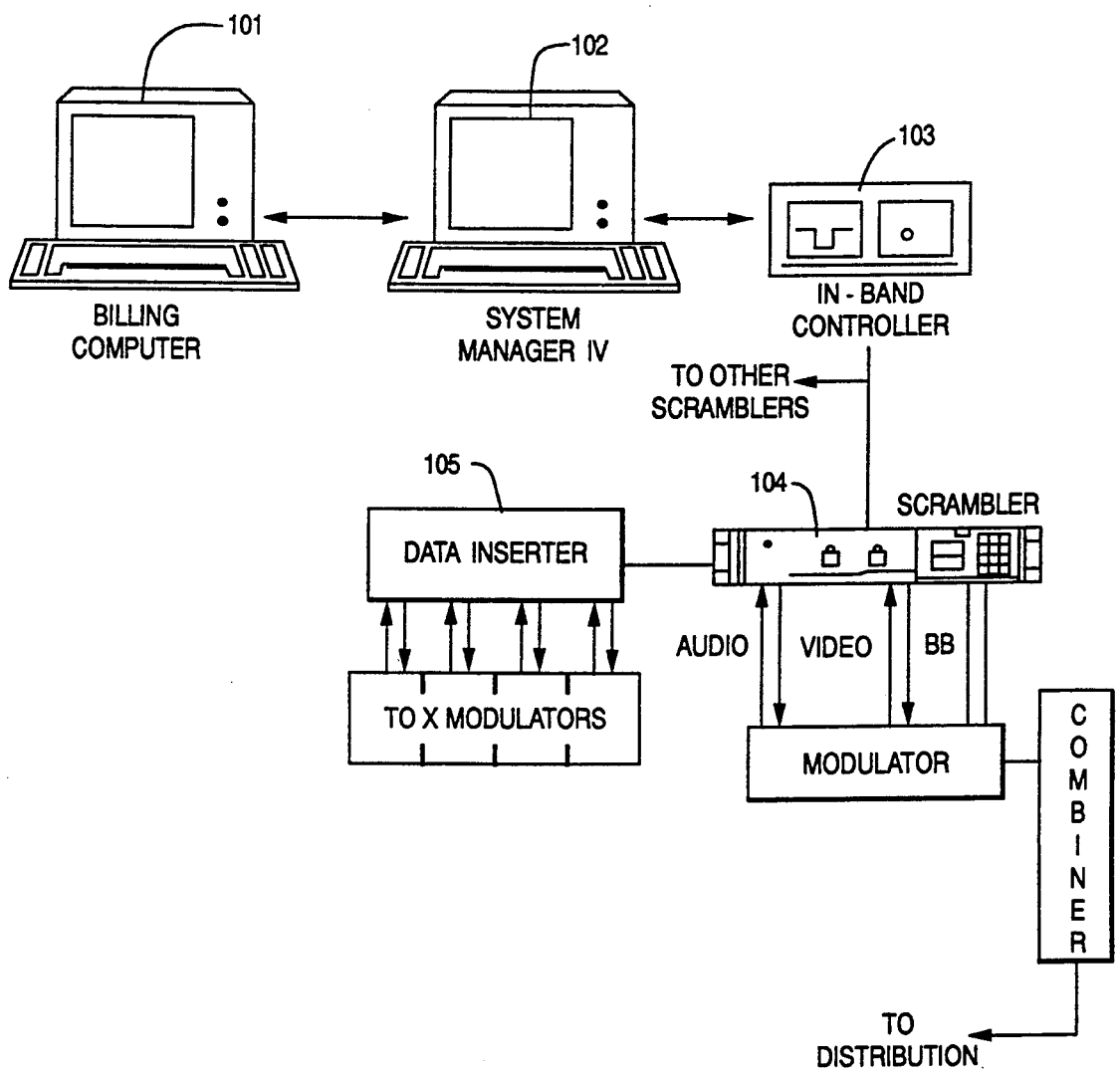
FIG. 1 is an illustrative view of an overall system configuration for the front end of a data transmission system.

FIG. 1 shows a simplified block diagram of the in-band system. The system manager 102 receives in-band transactions from the billing terminal 101 and sends in-band and ATX transactions to an in-band controller (IBC) 103.

The IBC is responsible for formatting system manager transactions for the scrambler and loop(?) ATX transactions to the ATX. The IBC has its own database. The IBC stores all transactions and has the ability to perform continuous refreshes.

In a preferred embodiment, the IBC can transmit up to 4 groups of data on one serial port at 38,400 bits per second (BPS). The four data groups or data streams as at terms can interchangeably be used or: 1) off channel data, 2) barker channel data, 3) PPV data, 4) premium channel data. The off channel is tuned most often over a long period of time, an estimated 80% overnight. The barker channel is tuned for short periods when the subscriber tries to access an unauthorized or invalid channel number, or selects a channel that is under parental control. All premium channels are assumed to be scrambled with data. All PPV/IPPV channels are assumed to be scrambled with data. There is also a PPV barker channel defined which is tuned when the subscriber tries to access a PPV/IPPV channel and no preview is available.

Each data stream has an unique group address that is received only by scramblers with the same matching address. For instance, premium channel data may have a group address of 01, and therefore all scramblers on premium channels should have a group address of 01. The IBC determines what data goes out on each data stream.

Once the data is received by the scrambler, the scrambler amplitude modulates data onto the audio IF signal of the channel modulator. Data can be fed out of the scrambler into a data inserter 105. The data inserter transmits in-band data on nonscrambled channels.

Figure 2:
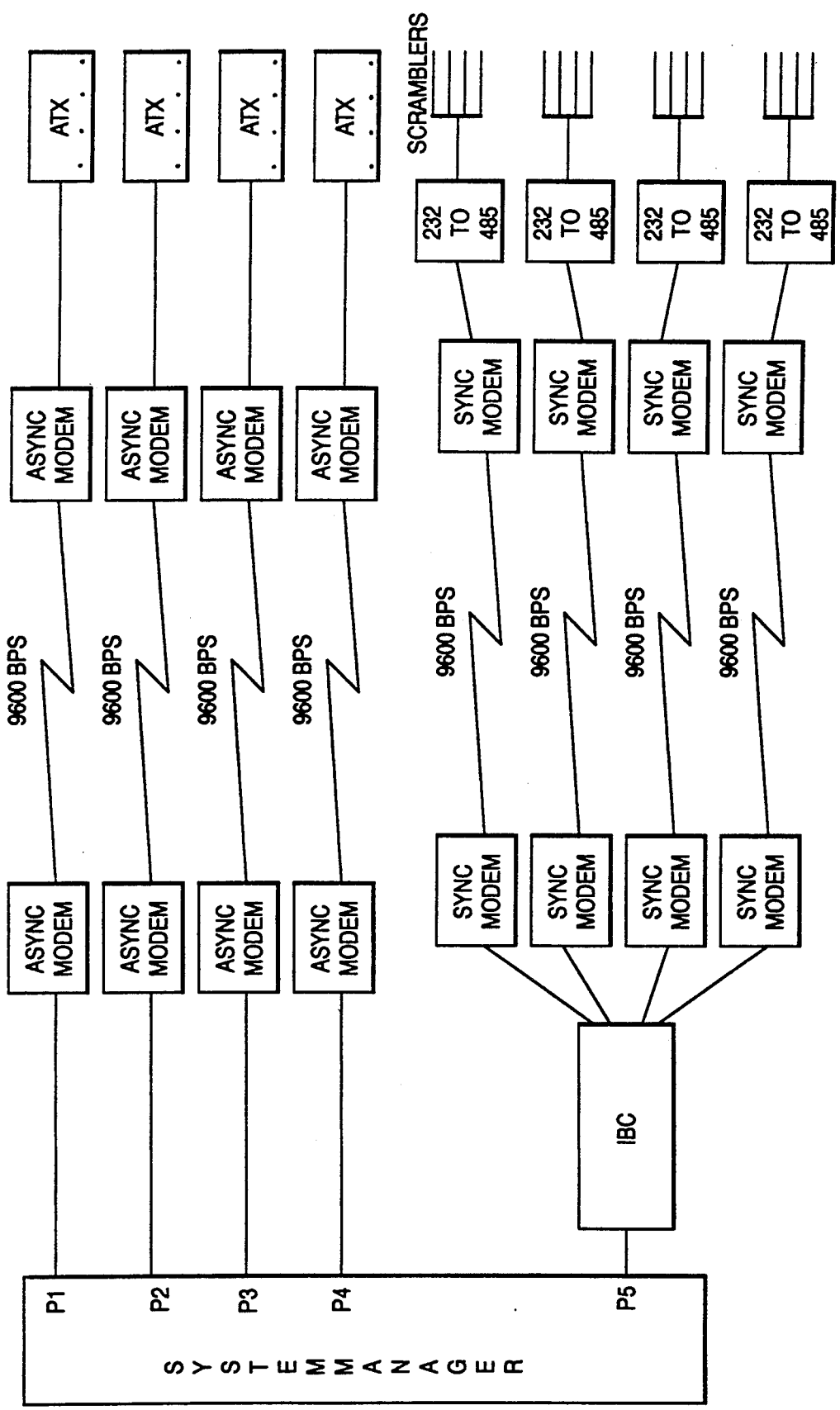
FIGS. 2, 3, 4, and 5 are block diagrams of various configurations capable of being employed in accordance with the present invention.

With reference to FIG. 2, there is shown a block diagram of an in-band system configuration with one IBC controlling four remote headends. Since the headends are remote, the IBC's output data rate is determined by the data rate of the phone system. In this case, a 9600 baud synchronous modem is shown to transmit in-band data. As a result, rather than sending four data streams at 38,400 BPS, the IBC transmits one data stream at 9600 BPS with one group address. As a result, each scrambler is given the same group address so that all scramblers at the headend receive the entire message. This configuration is somewhat similar to an out-of-band system, especially if data inserters are used on all non-scrambled channels.

Some advantages of this configuration are that one IBC is used to control multiple headends. Further, there is no requirement for a scrambler for the off and barker channels. However, the tradeoff of this configuration is that the data rate is one fourth of the IBC's capability.

Figure 3:
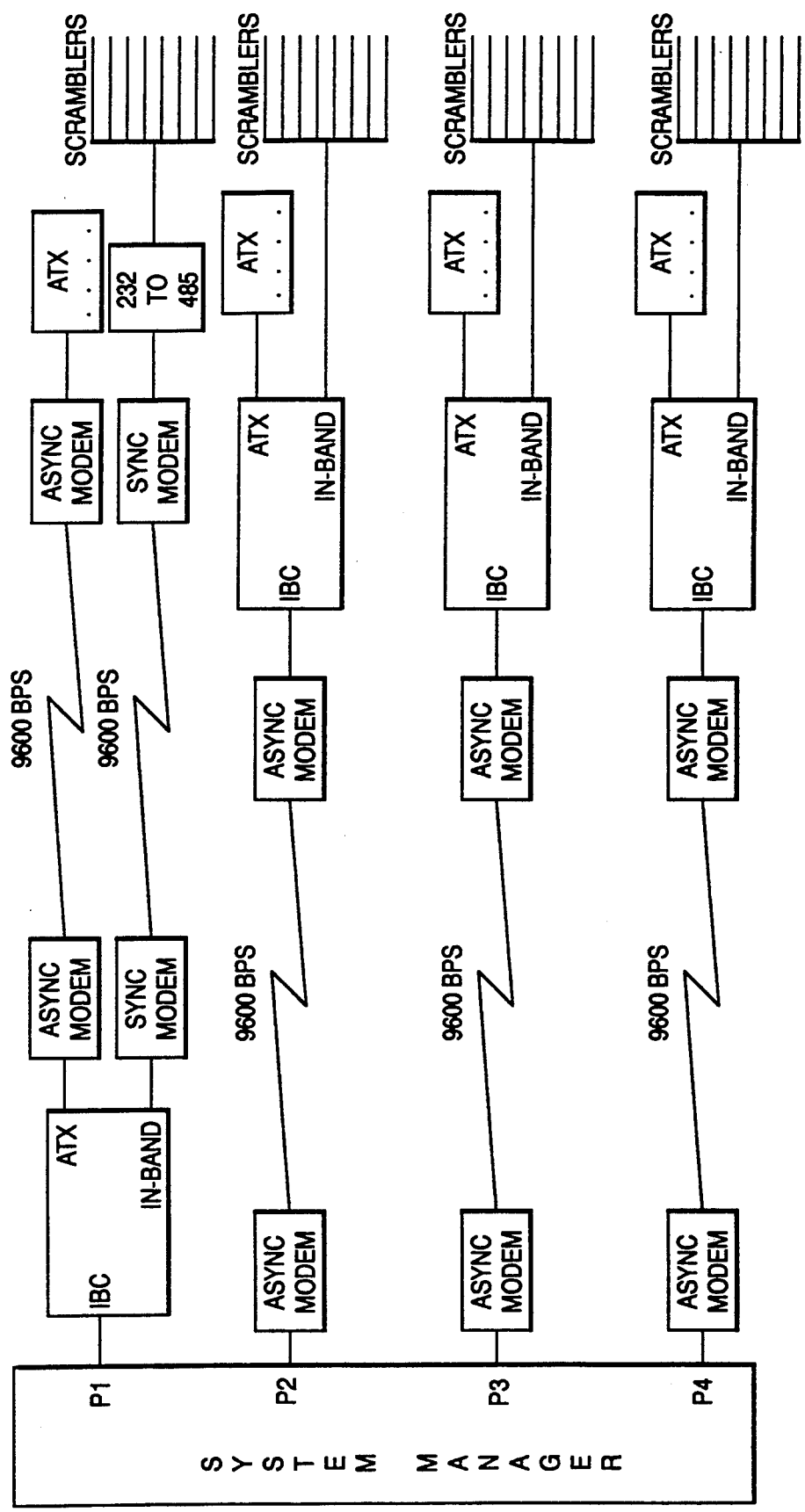

A second configuration is shown in FIG. 3. FIG. 3 shows a four headend system with three IBC's located at remote headends and one IBC at the system manager site. Such a configuration may be used due to environmental conditions at a headend site.

The IBC in this configuration is shown to be operating at 38,400 BPS. The IBC is also transmitting four data streams with four unique group addresses. This configuration eliminates the headend constraints placed on the configuration of FIG. 2 because the system manager is controlling headend data through each asynchronous port. One advantage of this configuration is that the data rate is now 38,400 BPS. Another advantage is that no headend constraints are placed on the system. Finally, and also important, is that the refresh rate is faster with this configuration. The refresh rate in an in-band system is very important since transactions must be repetitively transmitted and the competition for data becomes intense. The tradeoffs with this type of system are that one IBC is needed for each headend. Also, scramblers are needed on the off and barker channels if the system is utilizing four data streams.

FIGS. 2 and 3 are illustrative of configurations possible with the in-band system according to the present invention. However, it should be understood that various other configurations are possible as will become obvious to one of skill in the art. One important feature that will become readily apparent to one of skill in the art is that the system manager is capable of transmitting information to both in-band settop terminals and out-of-band settop terminals. The choice of whether to place an IBC at the system manager site or at a headend will depend on various factors including environmental considerations (heating/cooling requirements), data transmission rate, cost and performance requirements.

The system manager interface which is not shown in FIGS. 2 and 3 can for all intents and purposes be considered to be a block within the system manager diagram not shown. As previously described and as will be further described in more detail below, one of the functions of the system manager interface is to determine whether system manager transactions are intended for out-of-band settop terminals or for in-band settop terminals.

Figure 4:
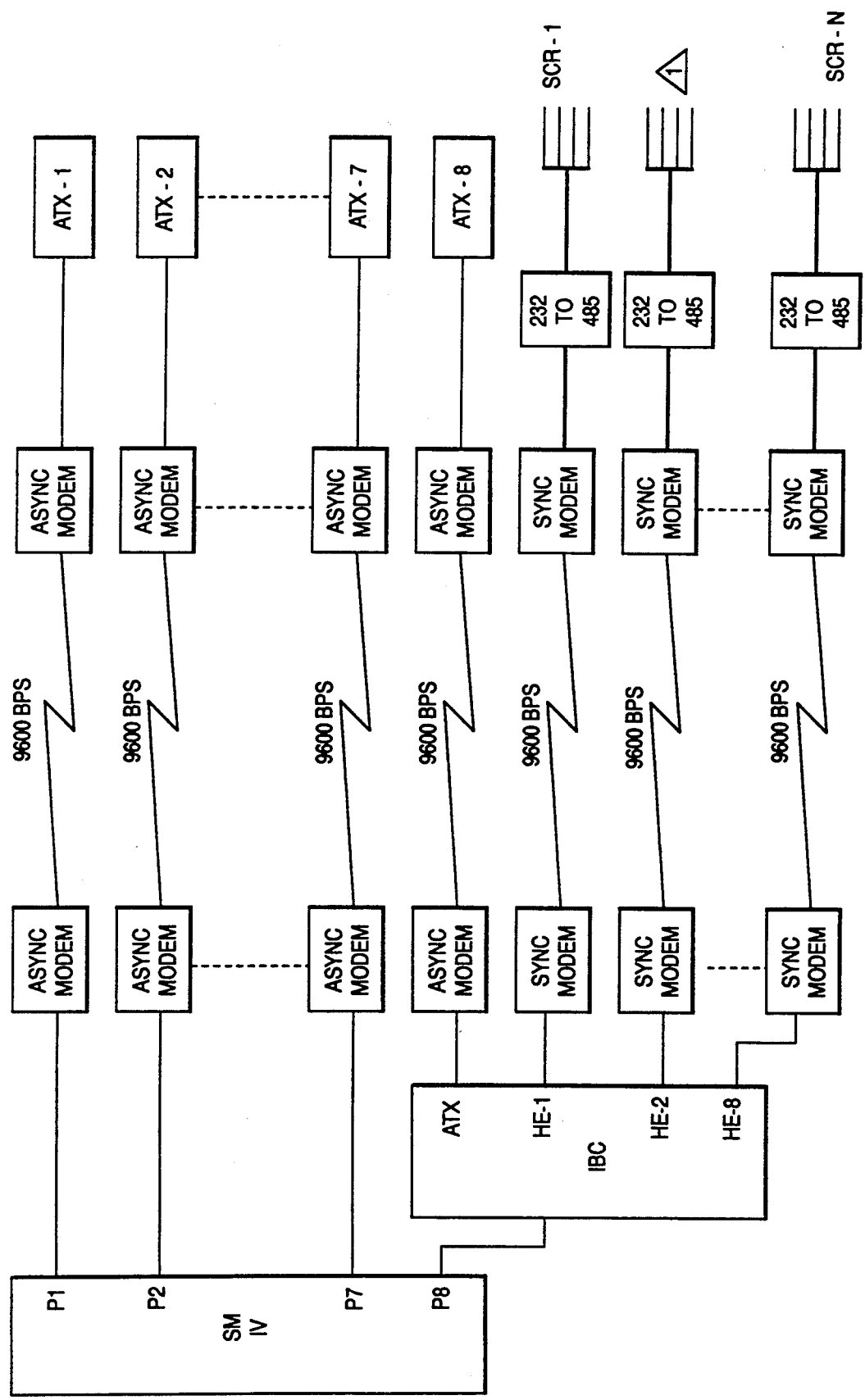
Figure 5:
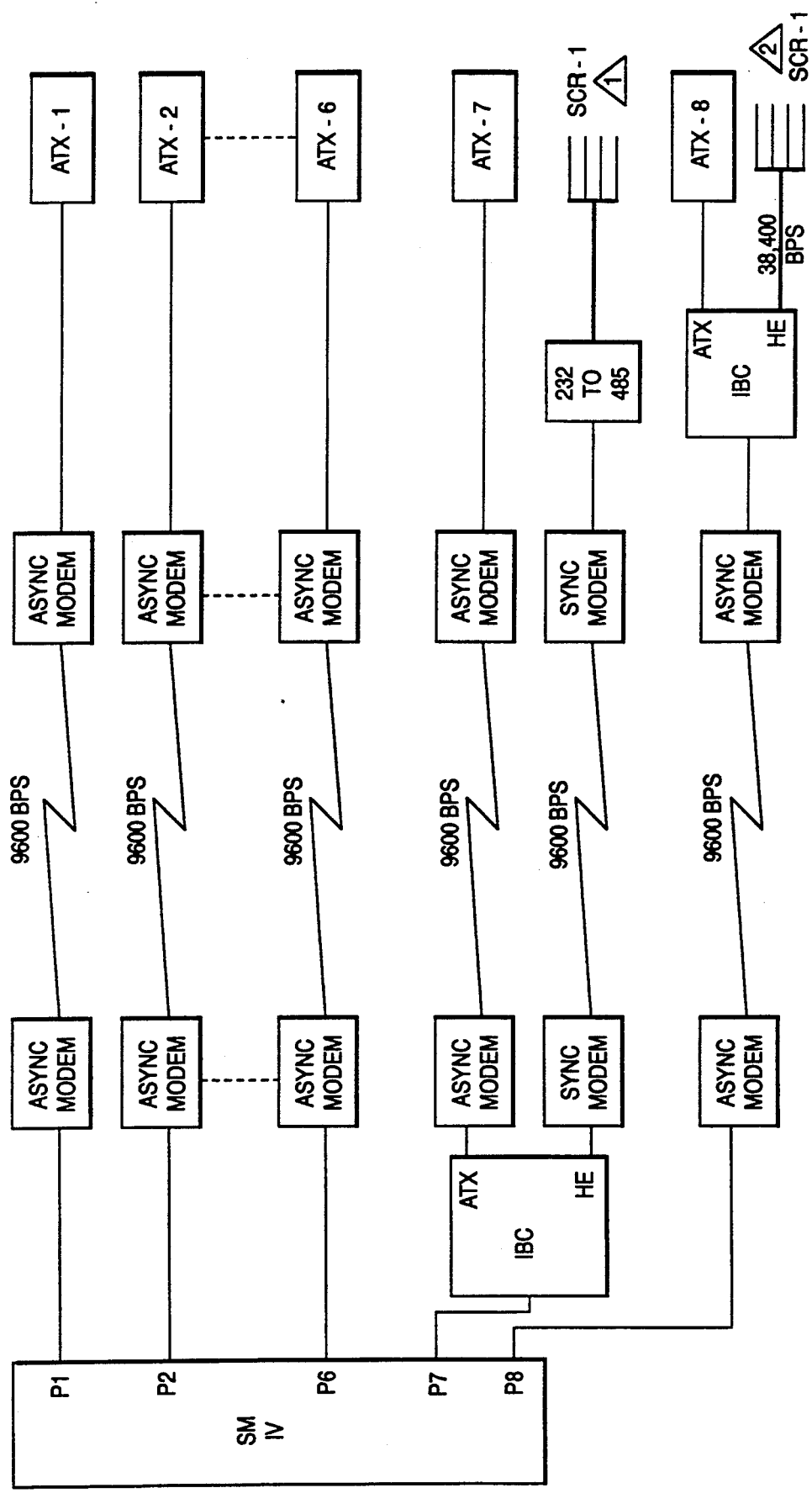

FIGS. 4 and 5 show configurations similar to the configuration shown in FIGS. 2 and 3 respectively. FIG. 4 shows a preferred configuration wherein up to eight headends can be supported by a single IBC. In this configuration the entire population of in-band set top terminals appears to the system manager as a single headend, with a single set of headend parameters. This implies that all the out-of-band headends must also have the same headend parameters. The scramblers at each headend are connected to the IBC by a 9600 BPS synchronous data link. The configuration of FIG. 5 shows that up to eight headends may be supported with a separate IBC for each headend with in-band settop terminals. In this configuration, each headend may have an unique set of headend parameters, and the system manager essentially ignores the distinction between in-band and out-of-band settops. The IBC for each headend may be located either at the system manager location or at the headend. Location at the headend may require environmental conditioning, but provides significant performance improvements. In the configuration of FIG. 5, data links may operate at 9600 BPS or at 38,400 BPS. For data links operating at 9600 BPS, scrambler interfaces must be configured as a single data stream. For data links operating at a 38,400 BPS, scrambler interfaces may be configured as either one of four data streams. It is to be understood that in these configurations the number of data streams, the number of headends and the number of IBCs is shown by way of example only and various other combinations will be readily apparent to one of skill in the art.

As previously mentioned, the major functions of the in-band controller involve translation of information from one format to another, storing the information, and repetitiously transmitting it to the ISTTs in the system. This functionality implies at least a logical structure composed of a data input (system manager) interface, an information format translation mechanism, a data storage and retrieval mechanism, a refresh driver mechanism, and a data output (scrambler) interface. In addition, certain control functions are required, primarily to maintain the configuration of the above mechanisms and in particular that of the refresh driver.

System managers are currently known in the art and therefore a detailed discussion of this component will not be necessary for an understanding of the invention.

The system manager interface serves as the primary source of control and data for the IBC (another source is the expert operator interface). The IBC accepts, for internal use, a modified set of system manager to ATX transactions. The IBC is also capable of selectively phoning messages to the ATX interface. The system manager interface has three layers: a physical data channel, a data link control protocol, and a defined set of data transactions.

Figure 6:
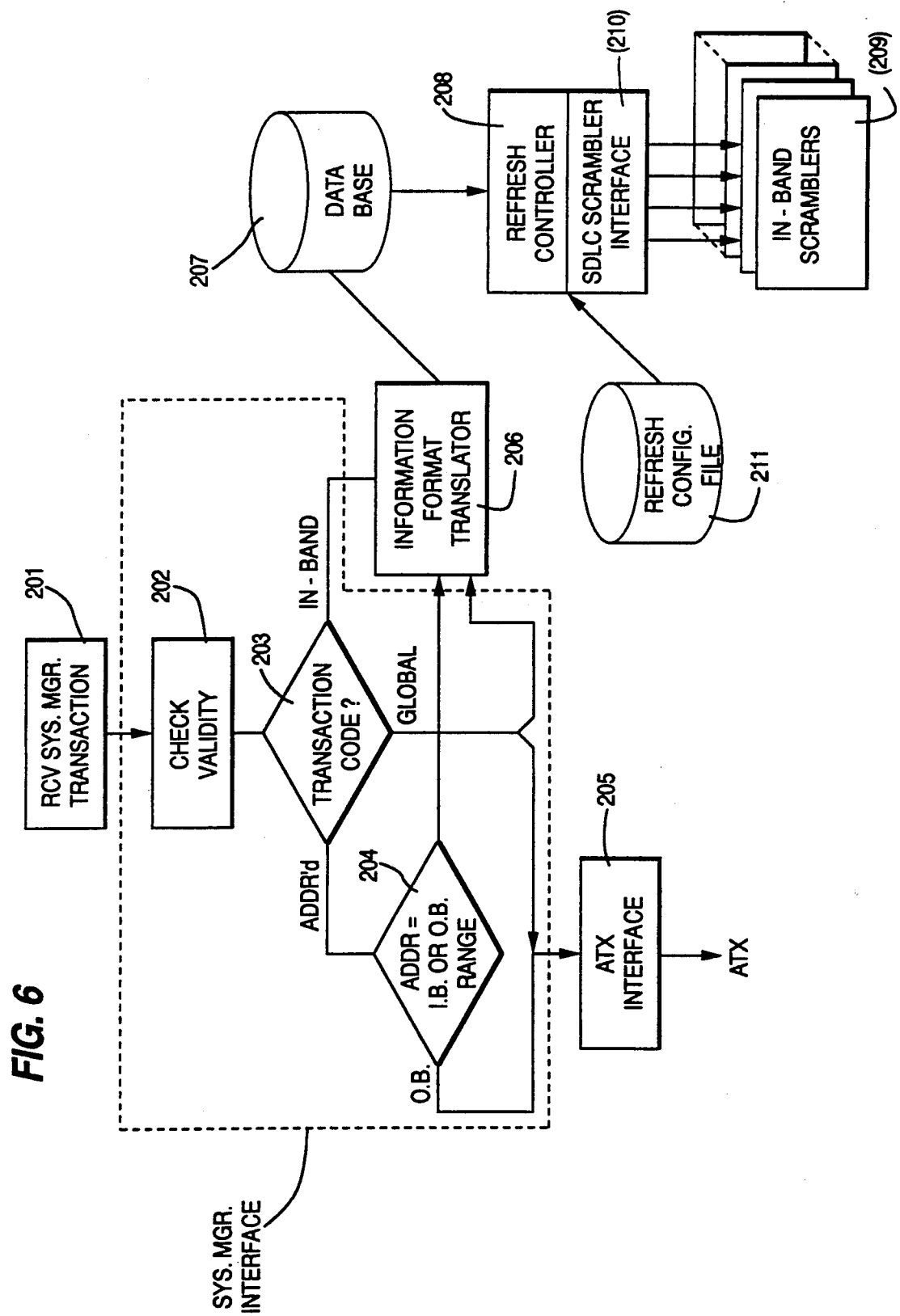
FIG. 6 is a combined flow chart/block diagram of some system components used in accordance with the present invention.

With reference to FIG. 6 the operation of the system manager interface will now be described. The system manager interface receives system manager transactions (step 201). After performing a validity check (step 202) in a manner known in the art, the system manager interface analyzes the transaction code (step 203). If the system manager interface determines that the transaction code is one intended for an addressed settop terminal, it then determines whether the address of the settop is within an in-band or an out-of-band range of addresses (step 204). If it is determined that the addressed transaction is intended for a settop with an address in the out-of-band address range, the system manager interface forwards the transaction to the ATX interface (step 205) which then forwards the information to the ATX in a manner that will be described below. If it is determined that the addressed transaction is intended for a settop with an address in the in-band range at step 204, the system manager interface forwards the transaction to the information format translator (step 206). If it is determined that the transaction is an in-band transaction, the information is forwarded to the information format translator (step 206). If the transaction code is determined in step 203 to be a global transaction code the information is transmitted to both the ATX interface (step 205) and the information format translator (step 206).

Figure 7:
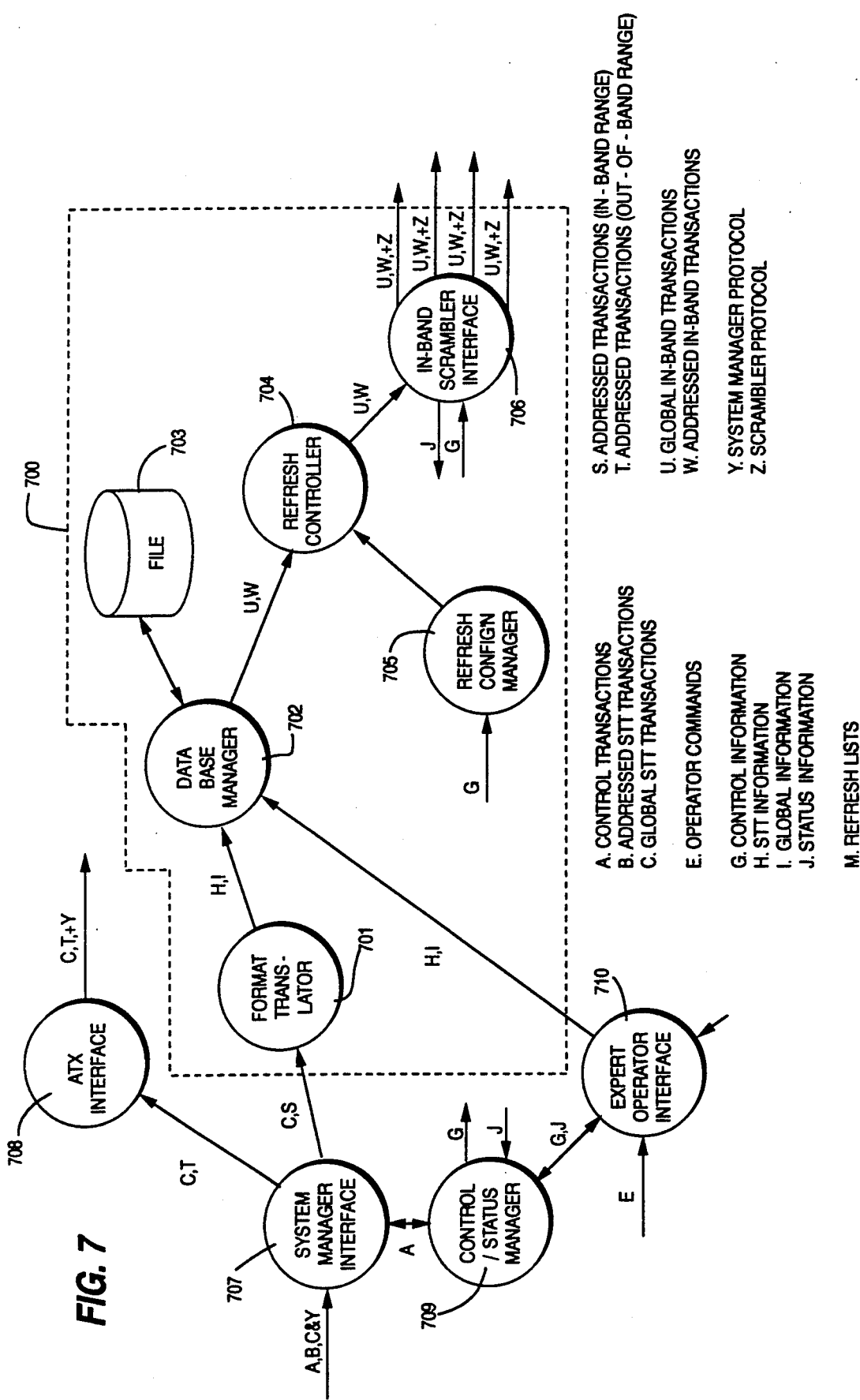
FIG. 7 is a software module diagram of the in-band controller and associated components.

FIG. 7 illustrates a software module diagram for the in-band controller. Various external connections to the in-band controller are also depicted. The in-band controller shown generally as 700 contains a format translator 701, a database manager 702, a database file 703, a refresh controller 704, a refresh configuration manager 705 and an in-band scrambler interface 706. Also shown in FIG. 7 is the system manager interface 707 which may be external to the in-band controller or may be incorporated therein. The system manager interface is also shown connected to an ATX interface and a control status manager 709. An expert operator interface 710 as shown is connected to the control status manager and to the in-band controller 700.

Figure 8:
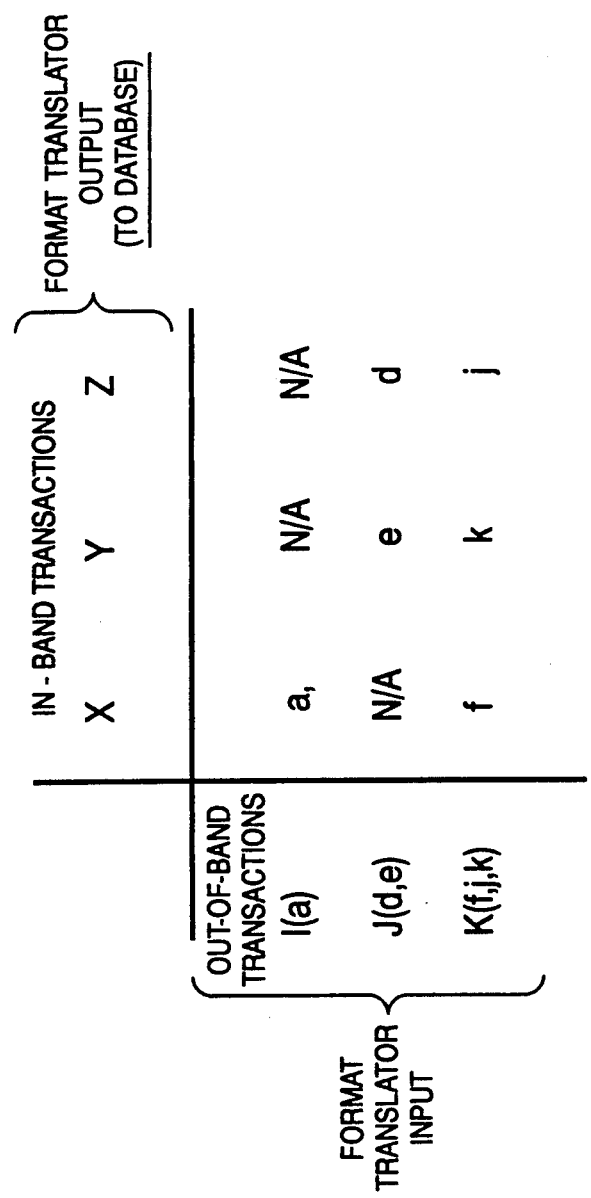
FIG. 8 is an illustration of the reformatting that occurs in the format translator.

The format translator 701 receives information including transaction codes and other data from the system manager interface. Such information is typically either global settop transactions or in-band addressed settop transactions. The format translator receives this information in an out-of-band format. Its primary function is to translate this information according to stored "maps" into in-band format transactions. This step is necessary in order to provide in-band/out-of-band compatibility. That is, the system manager which issues the transactions and other information, issues them in an out-of-band format so that the information that is intended for out-of-band settops can be received by an ATX interface and be transmitted to the ATX and then on to the out-of-band settop terminals. If the information from the system manager were provided in out-of-band format, it would be necessary to provide a format translator in the out-of-band data link in order to translate in-band data to out-of-band data. However, for various reasons it is preferred to provide the format translator in the in-band controller. Each out-of-band transaction may comprise one or more fields of data. For purposes of example only, it can be seen from FIG. 8 that there are shown three out-of-band transactions, I,J,K. Transaction I is shown as having one field, (a). Transaction J is shown as having two fields, (d, e). Transaction K is shown as having three fields of data, (f,j,k). These transactions would be input to the format translator and the format translator would reformat them to provide in-band transaction formats. For example, in-band transaction X may comprise information from field A of out-of-band transaction I and information from field F of out-of-band transaction K. It can be seen from this example, therefore, that it is possible that one in-band transaction may be made up of part of one or more out of band transactions.

Similarly, it can be seen that in-band transaction Y is composed of information from field E of out-of-band transaction J and field K of out-of-band transaction K. Finally, in-band transaction K is shown to be comprised of field D data from out-of-band transaction J and field J data from out-of-band transaction K.

Once reformatted, these in-band transactions, e.g., X, Y, Z, are output from the format translator to the database manager 702. Again both addressed settop terminal information and global information are received by the database manager 702 from the format translator.

The aggregate collection of information pertaining to the ISTT is referred to in this application as the "database". This information may be stored within file 703 of Data Base Manger 702. It is critical to the practice of this invention that the nature of the data flowing into and out of the in-band controller be discussed, in order that the structure of the information base can be properly designed and that proper control mechanism for managing it may be included.

The key aspects of the information that must be considered when designing the database include its type and value, its destination, and its open "time" duration. This is a consequence of the following relationships: information values are inherently linked to ISTT destinations. The information is sent to its destination grouped by type. Information values may or may not be valid for a certain duration of time.

The information type refers to the general content class of the information and is related to the particular grouping "i.e. transaction" used to send the information, to a scrambler (for example, authorization information, feature matrix information, PPV load map information, etc.). Type and value are related in that, within a type, information has specific values.

The destination aspect of the information in the database has to do with which set of ISTTs the information elements are addressed to. Traditionally, this has either been one particular STT or all STTs. The in-band system supports the normal global (i.e. set of all ISTTs) information transfer, but introduces the capability of transmitting identical values of a type of information to multiple ISTTs at once. Preferably, depending on the type of transaction, a transaction code may be sent with up to seven addresses. More or less addresses may also be used as will be apparent to one skilled in the art. Theoretically, this enables refresh data to be transmitted at a rate seven times faster than conventional systems since each transmission accesses seven ISTT whereas prior systems access one STT per transmission. In actuality, the present invention may not provide refresh at a rate seven times greater than the prior art since some transactions can not send seven addresses and for other practical considerations. However, it is clear that the present invention can provide refresh data at a much greater rate than the prior art. In actuality, the value is transmitted once along with six destination address. To make efficient use of the available bandwidth, this capability must be utilized. This implies that groupings of destinations with identical values (of an information type) are an important referent into the information base. The time duration of information (i.e. the period of validity) is a somewhat artificial construct, since all of the information must be considered ultimately changeable and therefore temporary in nature. However, there are certain types of information which actually relate to real time and have a specific, finite time duration during which they are valid. Other information changes on an infrequent basis and may be considered relatively static. This observation points out the convenience of having some distinction within the structure of the database that classifies information with respect to notably different time durations.

Yet another consideration which affects the database design is the frequency of access of certain information. Specifically, it may be desirable to transmit database information which has been recently added or changed to the set tops more frequently than information which is more mature. This makes the new information more available to the destination at a time when it is most needed. As a consequence, the age of information is another important characteristic by which information may have to be accessed as a general class. It is probable that it would be sufficient to simply categorize information as new for some configurable time period or until a predetermined number of newer transactions are received, followed by a mature status for the remainder of its lifetime.

The general operation involving the grouping, storage and retrieval of information from the information base are loosely grouped under the term database management. Actually, the storage and retrieval functions are only a subset of the database management operations which also involve organizing and structuring the information, initializing the information base, and updating (i.e. additions and deletions) the information base. Mechanisms must be incorporated which provide for control of these operations.

The drive for the control mechanism is preferably derived from a combination of interpretation of transaction content and explicit system manager control transactions. For example, when the system manager sends a new value for a specific item of information, it may be a stimulus to delete the old value and add the new. Such operations require no new operations with respect to the system manager. However, if the information has the time duration or destination characteristics mentioned above, there is little or no means within current system manager transactions to convey this.

The requirement to constantly, repetitively and efficiently transmit the information base arises from one basic reason: since there is no permanently tuned data channel, all information flow to the ISTTs is subject to the indeterminate availability of a data path to the ISTTs. However, to further complicate matters, some of the information is real time critical, i.e. it may pertain to events that currently in progress or it may be critical to maintenance or service changes. In other information, although less time critical in nature, may be of considerable value. Some information is pertinent only to certain of the data streams while certain information causes a write to nonvolatile memory in the ISTTs and must be sent at minimal intervals.

In short, different parts of the information base has considerably different requirements with respect to the spatial (data stream) and temporal (priority and frequency) requirements for transmission. It follows then that it is necessary to have a mechanism that can figure the refresh requirements for individual information transactions. Certain aspects of this configuration can be derived from the nature of the information itself, but some of the refresh configuration must be controllable with explicit external commands.

The database manager 702 is the process responsible for maintaining the database. In order to control the flow of information into and out of the system, the database manager has the capability of performing add, change, delete, and move (copy) operations on any desired piece of information in its data files. Preferably the database will be capable of being accessed at a minimum based on information type and destination. The term database will be used to refer to a collection of data files holding data necessary for the operation of the in-band system.

Preferably there are seven distinct files, four of which have what is called new list files associated with them. Each data file has been designed to serve a specific purpose. Each new list file keeps track of the most recent changes in data corresponding to its most regular data file. The database manager is capable of searching for, locating, and retrieving a desired piece of information associated with a given key field.

Figure 9:
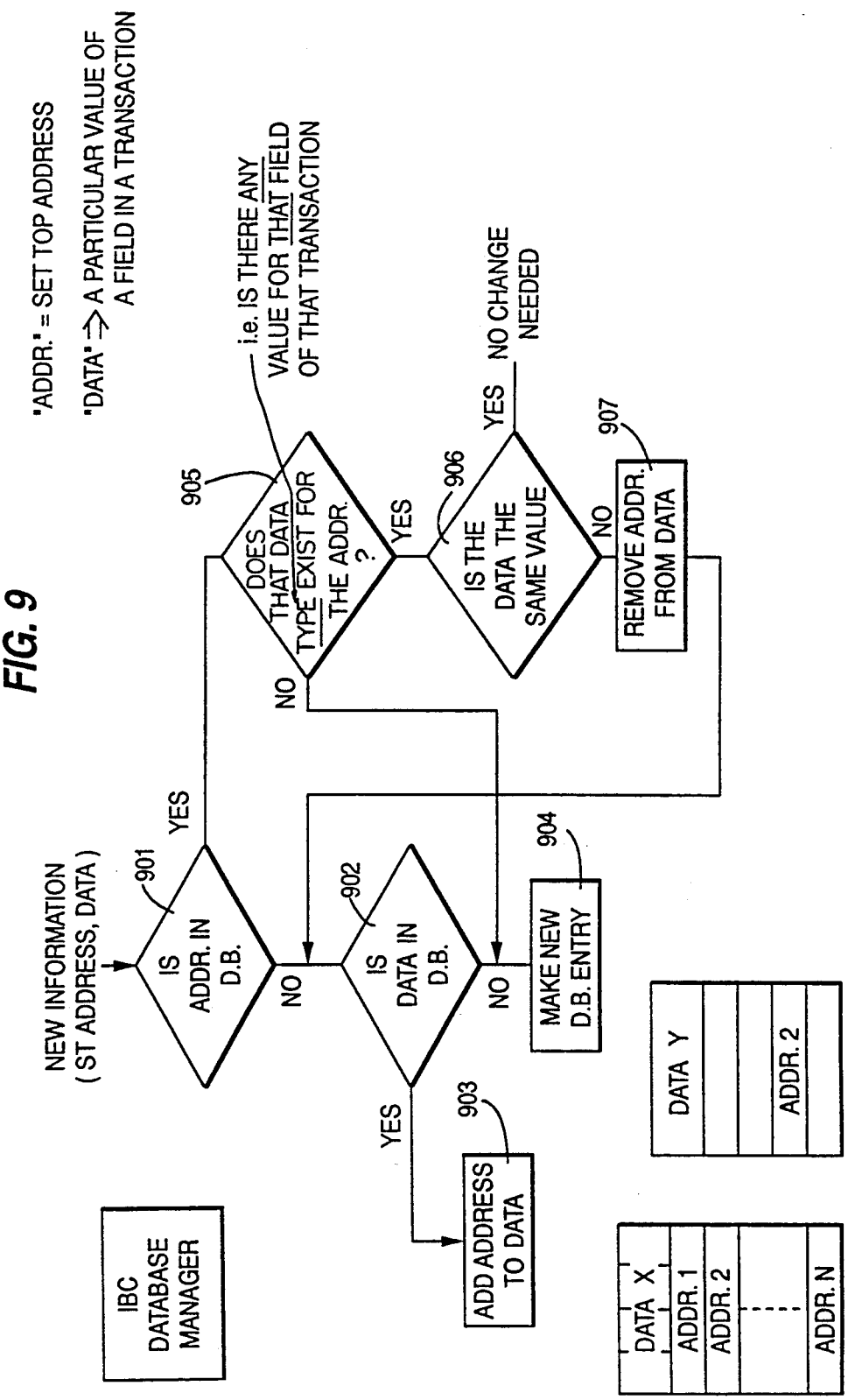
FIG. 9 is a flow chart describing the operation of the in-band controller data base manager.

The operation of the database manager in accordance with a preferred embodiment of the invention will now be described with reference to FIG. 9. The terms address and data are used here to describe "ISTT addresses" and "particular value of a field in a transmission", respectively.

As new information is received by the data base manager (DBM), the DBM first determines if the received address is currently stored in the database (step 901). If the address is not currently stored, the DBM determines if the data is stored in the database (step 902). If the DBM determines that the data is stored then the address received with the new information is added to the addresses stored with that particular data (step 903). If this data is not currently stored, a new entry is made in the database which stores the received data and the received address (step 904).

Returning to step 901, if it is determined that the address is already stored in the database, the DBM determines whether the received data type exists for that address (step 905). If the data type does not exist, a new data entry is made which stores the received data and the received address (step 904). If the DBM determines in step 905 that the data exists for the address, it then determines if the data is the same value as the data stored (step 906). If the value of the data stored is the same as the received data, no change is necessary. If however, the data is not the same value as the data stored, the address is removed from the stored data location (step 907) and control passes back to step 902.

FIG. 9a is now referred to to exemplify how the above process works. Suppose new information is received by the DBM containing 'DATAX' and 'Address1'. The DBM determines whether Address 1 is stored in the database. If it is not, the DBM sees if DATAX is stored. If DATAX is stored, then address 1 is added to the list of addresses associated with DATAX. If DATAX is not stored, a new entry is made in the database with DATAX and Address 1.

If Address 1 is stored, it is determined by the DBM whether DATAX exists for address1. If not, a new entry is made in the database with DATAX and Address 1. If DATAX type data exists for Address 1, the DBM determines whether the data value stored is the same as the value of the received DATAX. If yes, no change is necessary. If no, the Address 1 is removed from DATAX storage. It is then determined whether DATAX type and value data is stored in the database. If yes, Address 1 is added to DATAX. If no, a new entry is made in the data base for DATAX and Address 1.

It should be understood that at step 905, the DBM determines whether there is any value for the field of that transaction stored for that address.

The general format of information transmitted to the ISTTs can be seen from FIG. 9a. That is for each type data of a given value, there is a list of associated addresses that are to receive this information. For each type data there is a "list" stored in memory. When the information needs to be retrieved for refresh, the information can be sent out once along with the addresses stored therewith. In this way, a plurality of ISTTs can receive information from one transmission.

The refresh controller 704 of FIG. 7 is constantly retrieving information in the form of in-band transactions and addresses from the database and passing them onto the in-band scrambler interface 706. The refresh controller insures that in-band transactions are sent out in a manner that is consistent with the refresh configuration list which establishes a hierarchy of data. This module also arranges the transactions so that none of the data streams are idle longer than the time it takes to send out three transactions. The refresh controller will send out 120 transactions per second to the in-band scrambler interface. Each of the four data streams will receive a unique set of 30 transactions from the base of 120 sent to the interface. Every 5 seconds this module will send out 116 transactions so that each data stream receives only 29 transactions. This insures that the scrambler sends out default transactions.

Figure 10:
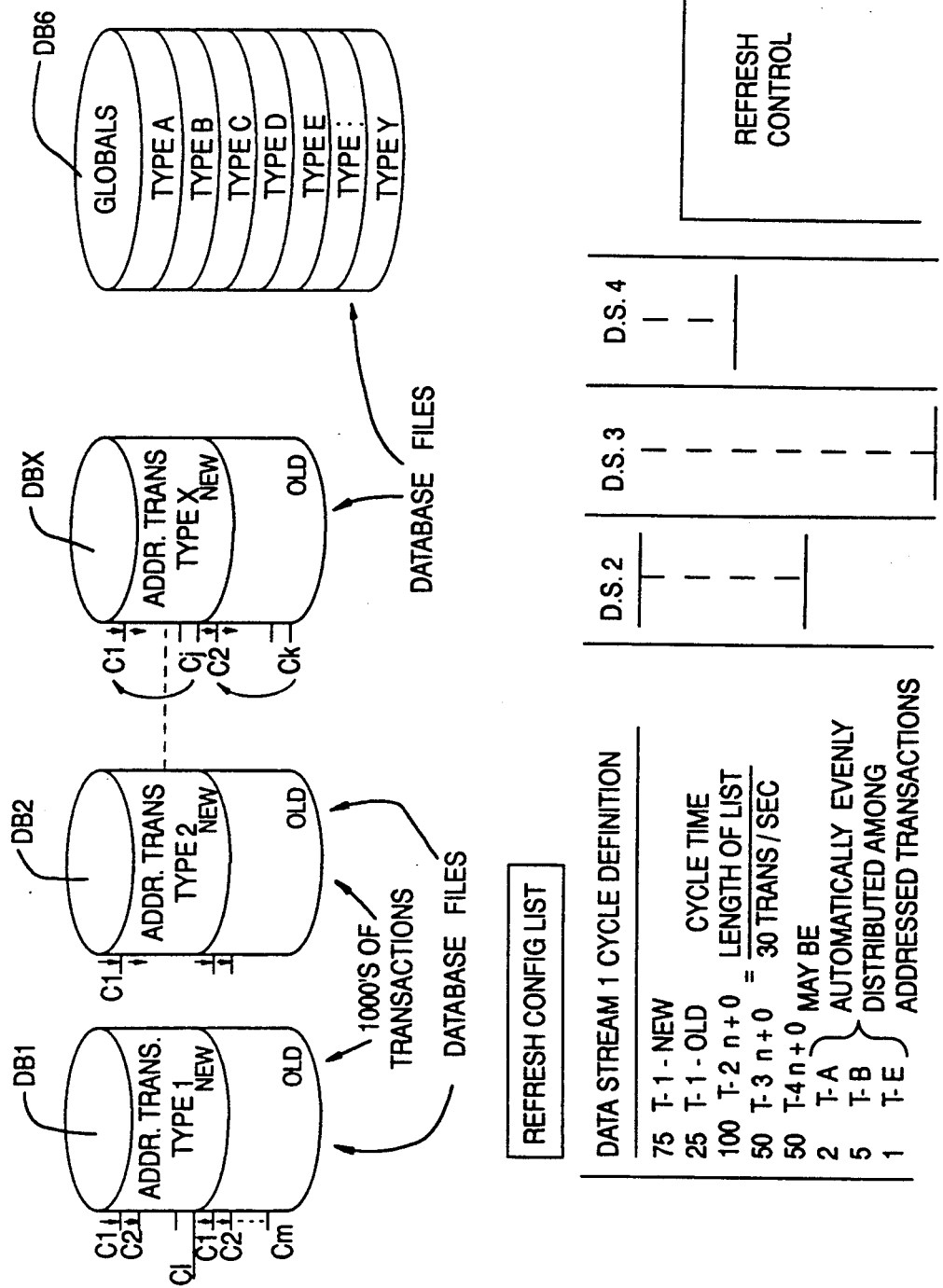
FIG. 10 illustrates the configuration of the data base files and the refresh configuration list for the individual data streams.

FIG. 10 illustrates the operation of the refresh controller with reference to the database files and the refresh configuration list. There is shown in FIG. 10 database files DB1, DB2 . . . DBX as well as DBG which indicates a database for storing all global information. Within each of the databases DB1 through DBX, there is stored the address of various transaction types. For example, DB1 may store information regarding transaction type 1 (T-1). Similarly, DB2 may store data regarding transaction type 2 (T-2). Within each of the database files DB1-DBX, each type transaction is broken down into new data and old data. This division of data may be based on the time the information has been stored or preferably a predetermined number of transactions will be stored in the new portion of the database files and as each new transaction comes in, the oldest transaction moves out into the old portion of the database files.

Within the global data base, DBG, there are stored various types of global information indicated generally as type A, type B . . . type Y to indicate various types of global transactions.

Since it is necessary in an in-band system to repetitively transmit data to the in-band settop terminals, and due to the fact that there are typically thousands of settop terminals operating off one system, not all information can be sent out at once. Therefore it is necessary to establish a hierarchy or protocol as to what information will be sent out when. Preferably, each database file will be cylically accessed in a predetermined manner. Furthermore, a certain hierarchy between new and old type data within each database will be provided to enable whatever information is considered the most important to the system at that time to be transmitted. It is further to be understood that each data stream will be used for different data transactions and therefore each data stream may have its own refresh configuration list.

By way of example a hypothetical refresh configuration list for data stream 1 is shown. As shown, within each cycle for data stream 1 according to this hypothetical, 75 type 1 new transactions will be transmitted. Similarly 25 type 1 old transactions may be transmitted. The list goes on to further show that a combination of 100 type 2 new and old transactions will be transmitted. This chosen value 100 could be divided equally between the new and old type transactions or one may be given preference over the other according to the needs of the system as will be explained further below. A plead in the explanation of the example, 50 type 3 new and old transactions and 50 type 4 new and old transactions will be transmitted each cycle. Furthermore, 2 type A global transactions, 5 type B global transactions and 1 type E global transaction for example may be transmitted. While the number of global transactions is indicated as being low with respect to the type 1, 2, 3 and 4 transactions, this is done by way of example only. Quite often global information is not changed as often as various other address transactions therefore it may be preferable to provide more type 1-type X transactions thatn it is to provide global type information. However under certain circumstances more global information may be desired in a given cycle or over a given number of cycles. If this is the case, than this refresh configuration list could be modified in a manner that will be explained below.

What this example shows is that during the first cycle of data stream information, 71 type 1 new transactions will be sent to the ISTT's and 25 type 1 old transactions will also be transmitted. A pointer within each database moves down the corresponding number of positions within that database. That is, after one cycle the pointer in the type 1 new database will move down 75 places from where it originated. Similarly the pointer in the type 1 old database will move down 25 places from where it originated at the beginning at that cycle and so on down the list until all information stored in the new portion of database wanted is completed. At that time, the pointer again moves to the top of the database file and the information is again cycled through. It is to be noted that it may take longer or shorter to get through the new part of database 1 then it would to get through the old part of database 1 depending on the number of transactions stored in each. Similarly the pointer in each of databases DB2-DBX operates in a similar manner to cycle through all the information in a database or a portion of a database to provide a constant refresh to the ISTTs. So too with the information stored in the global database. Each type of global information has its own pointer and each type global transaction is cycled through within the database for the globals.

Each cycle for each data stream is determined by the number of transactions to be transmitted. In the example shown, data stream 1 has 308 transactions per cycle. Since the transactions are entered at approximately 30 transactions per second, the cycle time or the time it would take to cycle through the refresh configuration list for data stream 1 would be equal to the length of the list (308) divided by 30 transactions per second, the transmission rate. As shown generally in FIG. 10, data streams 2, 3 and 4 where each have their own refresh configuration list and the length of each list may vary.

The types of transactions that are sent over the different data streams depend on a number of factors. One factor is the characteristic of the data stream itself. Another factor may take into account the viewer statistics for that data stream. Other factors that may be considered are the time of day and whether a pay-per-view or impulse pay-per-view event is authorized.

While FIG. 10 illustrates four data streams, more or less can be used. According to a preferred embodiment of the invention, there are however, four data streams used. These data streams relate to the OFF CHANNEL, the BARKER CHANNEL, the PPV CHANNELS and the PREMIUM CHANNELS. Some of the characteristics of these different data streams will now be discussed.

The OFF and NONPREMIUM NONSCRAMBLED CHANNELS may contain addressable channel map numbers, matrix information, and PPV load map information on a rotating basis interspersed with all globals at regular intervals.

The BARKER CHANNEL may typically receive recent database changes on a fast-pole basis interspersed with all global information.

The PREMIUM CHANNELS may be used for transactions regarding addressable channel map numbers to all addresses on a rotating basis with periodic global map definitions. This will be described further below. The PPV CHANNELS would typically transmit transactions regarding addressed PPV bit maps with PPV and IPPV globals transmitted at least once per second. All data streams preferably transmit all immediate transactions when sent by the system manager.

As will be appreciated by one of skill in the art, this refresh configuration list may typically contain thousands of transactions. It is therefore highly desirable to transmit these transactions in as short a time as possible in the most efficient and economical manner to thereby cycle through each database at the fastest rate. By formatting the data as done in the present invention, greater efficiency is achieved. As was described, earlier typical in-band transactions are transmitted with one transaction code and up to seven addresses plus data. In the prior art and in out-of-band transmissions, there is typically one transaction code one address in data. It can therefore be seen that with each transmission of in-band settop data according to the present invention, up to seven times as much information can be transmitted as compared with the prior art. The advantages thereof are obvious to one of skill in the art. More addresses can be accessed per unit time which provides greater performance and a faster refresh.

The refresh configuration lists are designed to be flexible. They may be programmed into the system by a refresh configuration manager.

The in-band scrambler interface 706 is an interface between the in-band controller and the in-band scramblers and is composed of preferably four data streams. Each of the data streams is made up of control and data transactions destined for particular sets of one or more scramblers that drive functionally related CATV channels. As described above, these data streams may typically be the OFF CHANNEL, the BARKER CHANNEL, the PREMIUM CHANNEL and the PAY-PER-VIEW CHANNELS (including IMPULSE PAY-PER-VIEW CHANNELS). The interface uses a single serial data channel which carries the combined data and control transactions for all four data streams. A data link control protocol provides the capability to adjust address transactions to a particular set of scramblers associated with a data stream. A transport layer protocol also allows addressing messages to individual scramblers. Each data stream is allocated one fourth of the aggregate bandwidth. The data transactions for the individual data streams must be interleaved, with a distribution guarantee that the scramblers receive transactions at a rate that does not require excessive amounts of buffering. In a preferred embodiment, the interface between the in-band controller and the inband scrambler uses shielded, twisted pair of cables as a physical interconnect medium for the data channels. The physical medium exists as a single linear cable segment formed from daisy chains twisted pair interconnects between the individual scramblers.

A standard nine pin D-type sibminiature connector is used for the in-band controller end of the data channel interconnect cable. The in-band controller data channel interface always terminates, both physically and electrically, at one end of the segment. A resistant terminator may be attached at the opposite end of this segment.

The scrambler interface data channel uses baseband synchronous signaling for data transmission. Because a single pair of conductors is used as a physical medium to connect stations in the preferred embodiment, the data and clock signals are combined using FM1 encoding. The data channel uses EIA standard RS-485 voltage levels for signaling. The signaling rate for the channel is 38,400 data bits per second.

The signal driver circuit for the data channel must be capable supplying RS-485 signal levels into a twisted pair cable terminated with a 120 ohms at each end, and a minimum of 32 RS-485 (unit loads) attached to the cable. Drivers must be capable of being placed in a high impedance state when the interface is not in the active transmitter. In the high impedance state the output leakage current must be less than 100 microamps with $V_{out}$ in the range of $+12$ to $-7$ volts. The driver circuits must present the high impedance state to the cable when in a powered down condition.

Signal receivers must operate over the standard RS-485 common mode voltage range specification, but with the following modified characteristics to allow up to 128 scramble units to be attached to the twisted pair:

| | |
|---|---|
| Signal sensitivity ($V_{T+max}$; $V_{T-max}$) +/− | 500 mV. |
| Hysteresis ($V_{T+min}$ - $V_{T-min}$) | 200 mV |
| Input resistance | 80 Kohms |

The interface between the in-band controller and the in-band scrambler uses the synchronous data link control (SDLC) protocol as the data link control mechanism. SDLC provides the key elements required in this application; station addressability, medium access control, and error detection. For the in-band system, the IBC always functions as the SDLC "primary station" and is responsible for the commands that control the data link. The in-band scramblers may function as SDLC "secondary station". By way of example, the format for SDLC frames is shown in FIG. 11. As shown in FIG. 11 there is a beginning and ending flag used to delineate the SDLC frame. After the beginning flag, there is an address which is used to designate the secondary station (data stream—scramblers) that is the destination or source for the frame. The address may specify the entire set of secondary stations if all capital global address values (F, Fh) is used. The control is used to indicate to the destination data stream if the information field contains control or data transactions. The information field contains the control and data transactions. This will be further described with respect to the transport protocol below. The frame check contains the check sequence used for error detection in a manner known in the art.

The SDLC address preferably refers to a secondary station. A frame is transmitted from the primary station (IBC) to a secondary station, then the address specifies the destination. If the frame is sent from a secondary station to the primary station, then the address identifies the source. The in-band system uses the SDLC Address as a Multi-Cast Group Address. Each data stream is a multi-cast group, and all stations (scramblers) that are associated with the same data stream use the same address. This is because the vast majority of transactions on a data stream or data transactions are directed to all scramblers in the data streams in parallel. Obviously, since there are four data streams, only four SDLC addresses are used in the in-band system. For control transactions, which must be directed to specific scramblers, a further layer of addressing is provided by the transport protocol as further described below.

The SDLC address also includes a global address GA value (F, Fh) which causes the message to be received by all stations on the data link. In the in-band system this capability is used primarily for scrambler control transactions.

Three types of SDLC frames are preferably defined for the in-band system; Data Frames, Control Frames, and Response Frames. Data frames preferably contain data transactions in the information field and are preferably directed to all stations (scramblers) in the multi-cast group (data-stream). Data frames preferably do not authorize a response from the destination. The in-band system uses a MSI code (nonsequenced information) with the Pole Bit equals zero as the Control Field for a data frame. Control frames are transmitted by the primary station (IBC) and contain control transactions in the information field. Control frames come in two varieties; frames which authorize and expect a response and frames which do not authorize a response. The frames which do not authorize a response, IVC uses a SNRM code (set normal response code) with the pole bit equals zero for the control field of the SDLC frame. For the frames that authorize and expect a response, the IBEC uses a SNRM code with the pole bit equals one in the control field. A valid response is not received within a predetermined time period, the primary station sends the control frame with the pole bit equals zero in the control field, effectively deauthorizing all responses. The primary station may then at its option retry the poling frame.

Response frames are returned by a single secondary station (scrambler) in response to reception of a control frame with the pole bit equal one. Since only a single station may respond, another level of scrambler specific addressing is implied. Response frame use a NSA code (nonsequence acknowledgement) with the final bit equals one in the control field.

Whenever a secondary station receives a valid frame of any type with the Pole/Final Bit (in the control field) equals zero, it must enter a nontransmitting state, even if it is in the process of responding to a control field. Also, if a secondary station receives a frame with an invalid frame check sequence while it is in the process of responding to a control frame, it must enter a nontransmitting state.

At any other time a frame received with an invalid frame check sequence is ignored. This applies both to frames received by secondary stations and the primary station. In particular, if the primary station receives a corrupt response to a control frame, it must still send a control frame deauthorizing the response before soliciting another response.

The transport protocol is used to define a set of data and control transactions sent over the SDLC data link. The transport protocol is not concerned with error control and has only limited addressing functions. The primary function of the transport protocol is to define the different types of transaction messages in the data field within each type of transaction. The relationship of the transport protocol transaction said data link control frame is shown in FIG. 12.

Data transactions transport the information for a single ISDT transaction to the scramblers. The IBC sends only the command code and data block portions of the ISTT transactions to the scrambler. The data blocks are sent with the transaction information as the leading blocks in a predetermined format. The following blocks are filled with either all ISTT addresses, global addresses, or empty blocks. When a scrambler receives a data transaction, it randomly rotates the box and correspondingly updates the command code, adds the remaining information in security fields, and sends it as in-band data.

Data transactions are sent from the primary station (IBC) to all scramblers in the data stream (multi-cast groups).

The format for a data transaction is shown in FIG. 13.

Unaddressed or global control transactions are sent from the primary station to all scramblers in the data stream (multi-cast group) or to the global address (all scramblers). Control transactions contain information that is not intended to be directly transmitted as an ISTT transaction on the in-band data channel. Control transactions contain information for purposes which may include control operation of the scrambler, set time of day, set up default or "special" ISTT transactions that are buffered for later transmission and trigger transmission of a default or "special" transaction buffer.

Unaddressed control transactions are preferably sent in a SDLC control frame with a pole bit equals zero. The format for an unaddressed (global) control transaction is shown in FIG. 14. As shown in FIG. 14 the global field signals that the message is destined for all scramblers on the data stream. The value of the global address is preferably always zero. The command code field contains a code that identifies the control message. Allowable values are preferably from 0 to 255. The data length field contains a number of bites to be transmitted in the data field. It too may have a value from 0 to 255 preferably. The data field is an optional field that contains control information supplemental to the control code.

Address control transactions are sent from the primary station to an individual scrambling. The SDLC address may be set to either a particular data stream (multi-cast group) or the global address (all scramblers). Control transactions contain information that is not intended to be directly transmitted as an ISTT transaction on the in-band data channel. Control transactions contain information for the following purposes: control operation of the scrambler set up default or "special" ISTT transactions that are buffered for later transmission, and trader transmission of a default or "special" transaction buffer.

Addressed control transactions are preferably sent in an SDLC control frame with the pole bit equal one. A response transaction may be returned to the primary station as a result of certain addressed control transactions. The format for an address control transaction is shown in FIG. 15. In FIG. 15 is scene of the scrambler address field contains the physical address for the destination scrambler. The value of the scrambler address is preferably in the range of 1 to 254. The command code is a field which contains a code that identifies the control message. Preferably the allowable values are from 0 to 255. The data length field contains a number of bites to be transmitted in the data field. They may have a value of preferably from 0 to 255. The data field is an optional field that contains control information supplemental to the control code.

Response transactions are sent from a single secondary station (scrambler) to the primary station in response to the reception of certain address control transactions. The only scrambler that is authorized to send the response is the one with an address matching the address field of the addressed control transaction. Response transactions are sent in a SDLC response frame with a final bit equals 1. The format for a response transaction is shown in FIG. 16. FIG. 16 shows a scrambler address field which contains a physical address for the scrambler that is the source of the response. The value of the scrambler address is preferably in the range of 1 to 255. The command code is a field that contains a code that identifies the addressed control transaction being responded to. Preferably allowable values are from 0 to 255. The data length field contains a number of bits to be transmitted in the data field. It may preferably have a value from 0 to 255. The data field is an optional field that contains response information (if any) requested by the addressed control transaction.

Each of the in-band scramblers transmits ISTT transactions at the nominal rate at 30 per second, corresponding to the refresh rate of the video signal being scrambled. Because the video channels are not necessarily synchronized or even frequency locked to each other, each scrambler may have a slight drift in transmission rate with respect to both other scramblers and the IBC. To compensate for the nonsynchronous system, the IBC sends transactions to each data stream at a rate somewhat slower than the minimum rate to which a channel reflect rate could drift. The scrambler therefore periodically becomes "starred" for data from the IBC. When the scrambler gets to the point that it needs to transmit another transaction, and has not receive a complete transaction from the IBC, then it inserts a "default" transaction into the in-band data. Transmitting the default transaction allows the scrambler to catch up with (an actually get ahead of) its data input requirements.

The default transaction is an arbitrary ISTT global, probably the "system security" transaction. It is preloaded and permanently stored in the scrambler specifically to be transmitted as a field message during the periodic IBC data underrun conditions.

Scramblers transmit ISTT transactions at a rate of preferably 29.97 transactions per second. Allowing for a worst case clocking mismatch between the IBC and any scrambler of 0.5 percent, the IBC should limit transmission of ISTT data transactions to approximately 29.82 transaction per second. By sending a maximum of 30 transactions per second for five seconds, followed by one second of sending only 29 transactions, an average rate of 29.83 transactions is achieved. Under nominal conditions this results in approximately one default transaction being sent to the scrambler every six seconds.

The IBC allocates 9,600 bits/sec of bandwidth to each data stream. Each ISTT data transaction is 31 bytes of data plus 6 bytes of SDLC protocol overhead, plus 2 bytes of clock sync for a total of 39 bytes or 312 bits per transaction. If the IBC transmit data transactions at the above calculated average of 29.83 transactions per second, this consumes 29.83 times 312 or about 9307 bits per second. The remaining bandwidth of 293 bits per second is available for control messages. Note, however, that control messages are in no limited to using only this amount of bandwidth.

As previously mentioned, the data transactions for the individual data streams must be interleaved, with a distribution that guarantees that the scrambler receives transactions at a rate that does require excessive amounts of buffering. The maximum burst transmit rate for any data stream should ensure that the scramblers should not have to buffer more than five data transactions under normal conditions. The minimum transaction transmission rate should ensure that the scramblers do not encounter an underrun condition more frequently then is intended by the techniques discussed in the paragraphs above.

An optional feature of the in-band controller is the expert operator interface shown as 710 in FIG. 7. The expert operator interface is intended as an on site control and maintenance mechanism for the in-band controller. It allows a qualified and authorized operator to enter commands which perform all functions normally available from the system manager interface, as well as certain diagnostic functions not ordinarily available to the system manager. These include the ability to view and change virtually all in-band database and configuration information. Except for the effects of the commands issued, the expert operator interface does not interfere with the normal functions of the IBC.

The expert operator interface may preferably be a standard PS/2 keyboard and video display unit as the operator console. The interface is a process that is constantly running under the operating system and protects the operating system from unauthorized access. Access to the expert operator interface command line functionality requires entry of a password. Access to the operating system from the expert operator interface requires entry of a password. Preferably passwords can only be defined using a system manager transaction. It is also preferred a log of all expert operator interface commands is written to a disk.

Preferably the in-band controller may be implemented according to preferred embodiment using an IBM Personal System/II, Model 50, for processing and mass storage. An IBM Model 8512, monitor is used as a console display for the expert operator interface. The IBC uses one add on memory board with two megabytes of semiconductor RAM, for a total system RAM complement of three megabytes. The memory board also provides additional serial ports. Two multi-protocol data link controller interface modules and associated cables complete the system hardware requirements. It is also preferred that the in-band controller uses the Microsoft/II multi-tasking operating system. The code is primarily implemented in the C language, except for where performance requirements dictate native assembly language. The Microsoft Compiler and associated tools are preferably used for software development.

Figure 17:
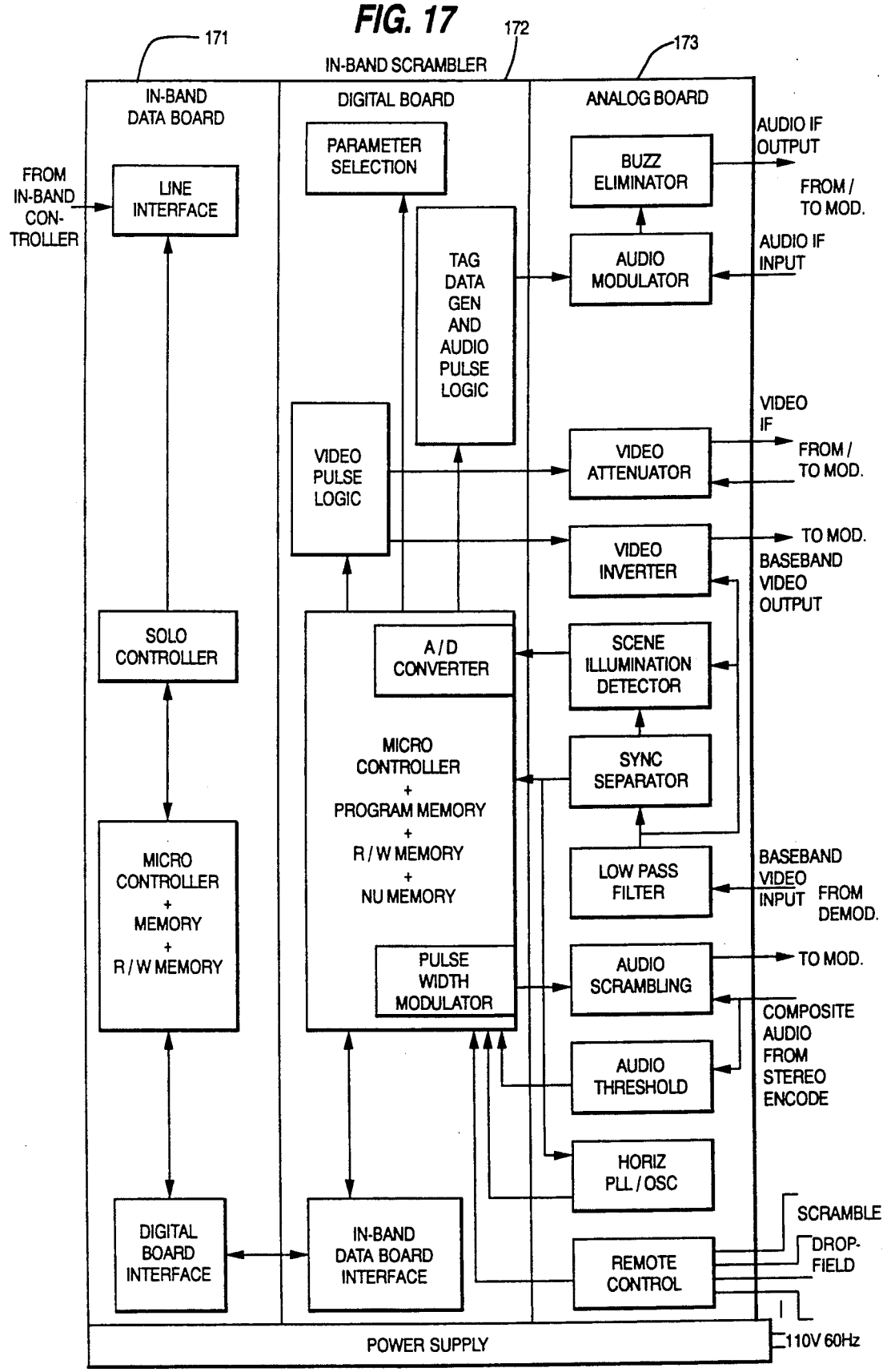
FIG. 17 is a block diagram of the in-band scrambler used in accordance with the present invention.
Figure 18:
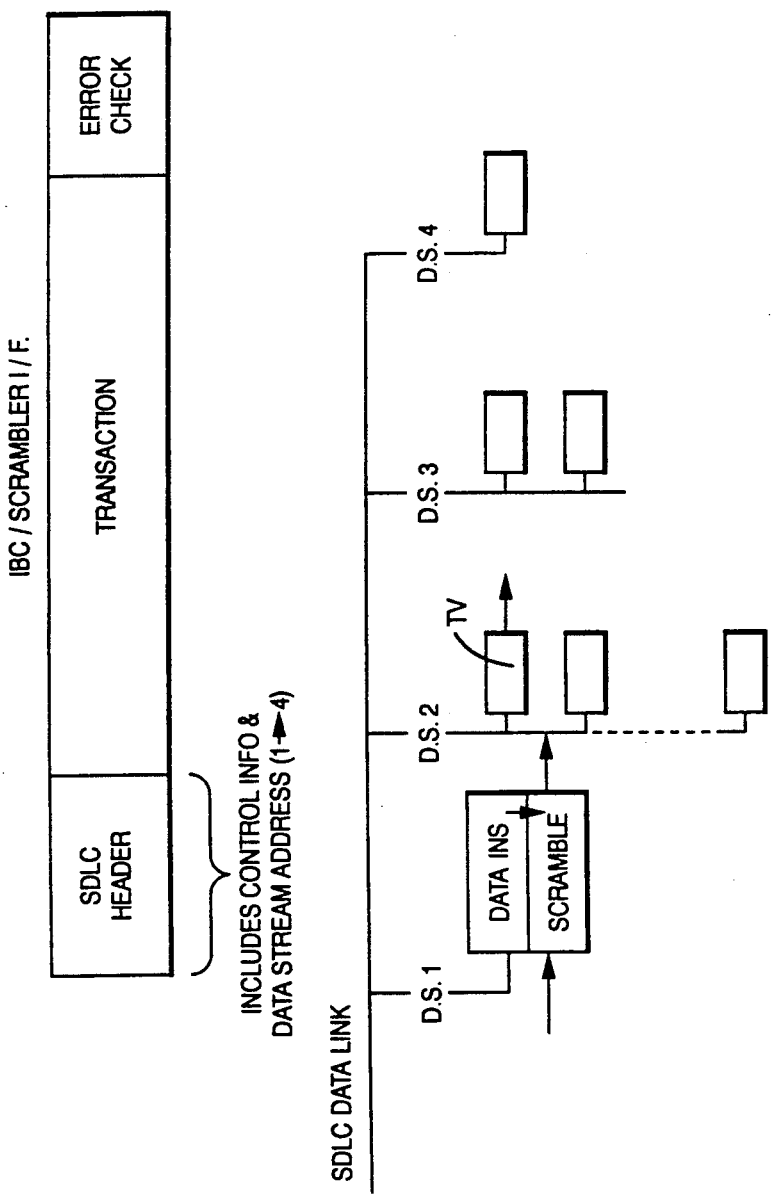

FIG. 17 illustrates in block diagram form the in-band scrambler used in accordance with the present invention. An input from in-band controller is received by a in-band data board 171. A digital data board 172 and analog data board 173 are also provided. On the in-band board 171 there is a line interface (previously described) and an SDLC controller. Also provided on the in-band data board is a microcontroller and memory and a digital board interface for interfacing with the digital board. The overall operation of the in-band scrambler is similar to scramblers of the prior art with a couple of very noted differences. One noted difference is the availability of data insertion to nonscrambled channels which are any further categorized in two ways. First the scrambler is capable of scrambling any television channel and generating control signals for descrambling. Second the scrambler is capable of inserting address and control information in-band in particular channels for the control of addressable settops.

The scrambler may be used to garble a television signal (both video and audio) for improved security in a subscription TV system that is equipped with the appropriate descramblers. The descrambler is placed in the IF signal path of a video modulator equipped with a DUAL IF LOOP (DIFL) option. The video may be scrambled in any manner known in the art including sync suppression which is achieved by attenuating the VIDEO IF SIGNAL during the horizontal blinking interval, VIDEO INVERSION which is achieved by inverting the baseband video before modulation and various other scrambling methods which would be apparent to one of skill in the art.

The composite baseband audio is scrambled by masking the audio level by a fixed amount. The audio scrambling is enabled to disable the intervals that appear to be random. These modes of scrambling are coupled with the current sync suppression and drop field scrambling. Changing the mode of scrambling is possible in intervals that appear to be random to thwart pirate boxes designed to defeat any one mode of scrambling.

The descrambling information is sent in-band in the audio carrier of the same channel. In the in-band scrambler the address and authorization information is also sent in the audio carrier of the channel. The address, timing, and authorization/deauthorization information is sent as amplitude modulator pulses in the audiocarrier. Custom coding is used to make unauthorized decoding difficult.

The purpose of audio scrambling is to preprocess the audio signal in such a way as to make it undesirable to listen to over a prolonged period of time. It is not intended to make the audio signal uncomprehensible but to make the changes in audio volume uncomfortable.

Each in-band scrambler has a switch selectable address in the range of 0 to 255. This is to facilitate the control of each scrambler by the system manager/in-band controller.

An interface is provided to facilitate defeat of presently known pirate schemes. The interface aides in the inclusion of additional pirate defeat circuits in the future. Also this interface can be used to add new options to the scrambler.

A real time clock module is included in the in-band scrambler to send the day-time information to the set-tops even when the data link from the in-band controller is not functioning.

The in-band scramblers take all SDLC data from the all IBC, add the time, channel ID's, four check bytes, two bits-high-count-bytes and ten scrambler control bytes, then reformat it to NTSC video timing. The data is transmitted as amplitude modulating pulses on the carrier which accompanied the descrambler timing pulses.

An optional audio modulator will be used to put OFF CHANNEL data pulses on a nonscrambled channel. The Off Channel scrambler will have a connector to supply power and the data stream to these transmitters.

Security is greatly enhanced by having data on premium and pay-per-view channels. The premium channels carry data about all ISTT's which are not authorized for this service, and pay-per-view channels carry the pay-per-view globals which indicate which event are and are not authorized.

Even though illegal ISTT's are barred from premium and pay-per-view channels, there is still a need for a refresh timer to remove all value from a stolen ISTT. The maximum value of this timer will be dimeler from the headend and range from preferably four hours to forty-two days. When the time expires, the ISTT will be forced to tune a BARKER CHANNEL until its address appears on the data stream. While one may be provided, there is no need for a legal terminal test since the constant refresh of address data and the thirty day timer will be sufficient.

New In-Band Transactions include:

Set ATX mode (enable/disable ATX interface)

Sets the ATX interface to either the Enabled or Disabled mode. Determines if global transactions are automatically forwarded to the ATX interface and addressed transactions are tested for forwarding.

Define ATX STT Address Range

Used when the ATX mode is set to Enabled. Defines a range of STT addresses that, when used as a System Manager transaction destination, cause the IBC to forward it to the ATX interface. Multiple transactions may be used to define more than one range.

Delete ATX STT Address Range

Deletes a range of STT addresses that has been set with the Define ATX STT Address Range transaction.

Define Channel

Defines a channel number, associates it with a scrambler address and assigns it to one of the four Data Streams Delete Channel Deletes a channel number, scrambler address, and data stream assignment.

Define (normal) Refresh Transaction

Assigns a particular type of scrambler transaction to the list of refresh transactions for a particular data stream. Provides capability to specify the relative refresh frequency and duration for this type of transaction.

Set Transaction Refresh Frequency

Re-defines the number of times a particular transaction type, already assigned to the (normal) refresh list of a Data Stream, is sent during a complete refresh cycle. Two values are specified, corresponding to two transmission phases. Each phase also has a duration count parameter that specifies the total number of times that the transaction is to be sent at that frequency.

The frequency of phase one has no "normal" value. The normal value for phase two is once (per refresh cycle). The range of duration for phase one is from zero to 65 thousand transmissions. The range of duration for phase two is from 256 to 32 thousand (in increments of 256), or indefinitely.

Define Special Refresh Transaction

Assigns a particular type of scrambler transaction to the list of Special refresh transactions for a particular data stream. This is a list that is maintained for each Data Stream separate from the normal refresh list, and is intended for especially high priority short duration transmissions. This list is checked each time a transaction is sent to the scrambler. The frequency of special transactions is specified as the inverse ratio of the special transaction to normal transactions. For example, a value of five results in the special transaction being sent once for every five normal transactions sent. A duration parameter specifies the total number of times that the transaction is to be sent.

Define Default ISTT Transaction

Defines the default ISTT transaction to be sent by a particular scrambler. Default transactions are sent by a scrambler when the refresh rate from the IBC falls behind the scrambler output rate. This condition occurs periodically by design.

We claim:

1. In a cable television system comprising means for generating data capable of being transmitted over a transmission path, transmission means for transmitting at least one television channel, scrambler means for selectively scrambling said generated data, in-band type set top receiving means at a first predetermined location for receiving said at least one television channel and receiving and descrambling said selectively scrambled data transmitted within said at least one television channel and out-of-band type set top receiving means at a second predetermined location for receiving said at least one television channel and receiving and descrambling said selectively scrambled data transmitted outside of said at least one television channel and any other television channel transmitted by said cable system, an apparatus for manipulating said generated data comprising:

control means operatively connected between said means for generating data and said scrambler means for receiving and analyzing data received by said means for generating data to determine whether said data is to be transmitted to said in-band type set top receiving means or said out-of-band type set top receiving means to control the transmission path said data is transmitted over.

2. The apparatus of claim 1 wherein said generated data is in a first format corresponding to a data format used to transmit data to said out-of-band type set top receiving means, said control means further comprising:

interface means for interfacing with and receiving data from said means for generating data and for determining whether said generated data is to be transmitted to one or more of said out-of-band type set top receiving means or to one or more of said in-band type set top receiving means or to one or more of both said out-of-band and in-band type set top receiving means.

3. The apparatus of claim 2 wherein said control means further comprises format translation means for receiving, from said interface means, data in said first format and for reformatting said data into a second format to enable said in-band type set top receiving means to receive data in said second format.

4. The apparatus of claim 3 wherein said interface means routes data, determined to be transmitted to one or more of said out-of-band type set top receiving means, to an addressable transmitter means;

said interface means routes data, determined to be transmitted to one or more of said in-band type set top receiving means, to said format translation means; and said interface means routes data, determined to be transmitted to both said out-of-band and in-band type set top receiving means, to both said addressable transmitter means and said format translation means.

5. The apparatus of claim 4 wherein said out-of-band type set top receiving means is characterized by receiving data from said means for generating data over a frequency band outside of the band of cable television system frequencies; and said in-band type set top receiving means is characterized by receiving data from said means for generating data over a frequency band within the band of cable television system frequencies.

6. In a cable television system comprising a data generating means for generating data, transmission means for transmitting at least one television channel and said data, scrambler means for selectively scrambling said data prior to transmission, out-of-band type set top receiving means at a first predetermined location for receiving and descrambling data transmitted outside of said at least one television channel and in-band type set top receiving means at a second predetermined location for receiving and descrambling data transmitted within said at least one television channel and any other television channel transmitted by said cable system, an apparatus for selectively inserting data into a nonscrambled channel comprising:

means for determining whether to insert data into a predetermined channel; and means for inserting data into said predetermined channel in response to a determination from said determining means.

7. A cable television system comprising data generating means for generating data, scrambler means for selectively scrambling data, transmission means for transmitting at least one television channel and an in-band controller means disposed between said generating means and said scrambler means for determining whether generated data is to be transmitted to in-band type set top receivers within said at least one television channel or to out-of-band type set top receivers outside of said at least one television channel and controlling the flow of data received from said generating means based on said determination.

8. The apparatus of claim 7 wherein data generating means is located remote from said scrambler means and said inband controller means is disposed in the vicinity of said generating means.

9. The apparatus of claim 7 wherein said data generating means is located remote from said scrambler means and said inband controller means is located in the vicinity of said scrambler means.

10. In a cable television system comprising means for generating data capable of being transmitted over a transmission path, transmission means for transmitting at least one program signal, scrambler means for selectively scrambling said generated data, in-band type set top receiving means at a first predetermined location for receiving said at least one program signal and receiving and descrambling said selectively scrambled data accompanying said at least one program signal and out-of-band type set top receiving means at a second predetermined location for receiving said at least one program signal and receiving and descrambling said selectively scrambled data not accompanying said at least one program signal, an apparatus for manipulating said generated data comprising:

control means operatively connected between said means for generating data and said scrambler means for receiving and analyzing data received by said means for generating data to determine whether said data is to accompany said program signal or not accompany said program signal to control the transmission path said data is transmitted over.

11. In a cable television system comprising means for generating data capable of being transmitted over a transmission path, headend means for transmitting at least one television channel, scrambler means for selectively scrambling said generated data, in-band type set top receiving means at a first predetermined location for receiving said at least one television channel and receiving and descrambling said selectively scrambled data transmitted within said at least one television channel and out-of-band type set top receiving means at a second predetermined location for receiving said at least one television channel and receiving and descrambling said selectively scrambled data transmitted outside of said at least one television channel and any other television channel transmitted by said headend, an apparatus for manipulating said generated data comprising:

control means operatively connected between said means for generating data and said scrambler means for receiving and analyzing data received by said means for generating data to determine whether said data is to be transmitted to said in-band type set top receiving means or said out-of-band type set top receiving means to control the transmission path said data is transmitted over.

12. A cable television system comprising;

data generating means for generating data for transmission over a transmission path, scrambling means for selectively scrambling said generated data, headend means for transmitting at least one television channel and said scrambled data within said television channel and for transmitting said scrambled data on a separate carrier outside of said at least one television channel and outside of any television channel, in-band type top receiving means at first predetermined location for receiving and descrambling said at least one television channel, out-of-band type set top receiving means at a second predetermined location for receiving said at least one television channel and receiving and descrambling said selectively scrambled data transmitted outside of said at least one television channel and by other television channel, on said separate carrier outside of said at least one television channel, and control means operatively connected between said data generating means and said scrambler means for receiving and analyzing data received by said data generating means to determine whether said data is to be transmitted inside said at least one television channel or on a separate subcarrier outside of said at least one television channel transmitted by said headend.

* * * * *